US006917701B2

(12) United States Patent
Martins

(10) Patent No.: US 6,917,701 B2
(45) Date of Patent: Jul. 12, 2005

(54) OMNIVERGENT STEREO IMAGE CAPTURE

(75) Inventor: Fernando Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 09/942,478

(22) Filed: Aug. 29, 2001

(65) Prior Publication Data

US 2003/0044060 A1 Mar. 6, 2003

(51) Int. Cl.[7] .............................................. G06K 9/00
(52) U.S. Cl. ........................ 382/154; 348/42; 348/49; 348/50; 345/419
(58) Field of Search ................................ 382/154, 284, 382/294; 348/42, 49, 50; 356/12; 345/419, 420, 424; 352/57

(56) References Cited

U.S. PATENT DOCUMENTS 6,639,596 B1 * 10/2003 Shum et al. ................ 345/427
6,665,003 B1 * 12/2003 Peleg et al. .................. 348/36

OTHER PUBLICATIONS

Peleg et al., Stereo Panorama with a Single Camera, Jun. 1999, Computer Vision and Pattern Recognition, Competer Society Conference, pp. 395–401.*
Shum et al., Omnivergent Stereo, Sep. 1999, Proceeding of IEEE International Conference, pp. 22–29.*

* cited by examiner

Primary Examiner—Bhavesh M. Mehta
Assistant Examiner—John Strege
(74) Attorney, Agent, or Firm—Steven D. Yates

(57) ABSTRACT

Methods and apparatuses for obtaining a first image and a second image defining a convergent stereo image, and constructing a three-dimensional images based on the obtained first and second images. In one embodiment, a deflector, such as a prism, is rotably mounted about an axis, and first and second inputs received by the deflector are deflected towards a receptor at or proximate to the axis. In one embodiment, the axis and the deflector are perpendicular to a rotation plane, and the first and second inputs are tangential to a region defined by the rotation of the deflector about the axis, opposing each other, and parallel to the rotation plane. The first and second images are respectively determined with respect to first and second inputs received as the deflector rotates about the axis.

34 Claims, 3 Drawing Sheets

OMNIVERGENT STEREO IMAGE CAPTURE

FIELD OF THE INVENTION

The invention generally relates to image capture, and more particularly to capturing omnivergent stereo image pairs for compactly representing 360° panoramic images of an environment surrounding a capture device.

BACKGROUND

There are many known techniques for generating three-dimensional images of a surrounding environment. Methods referred to as "360 panorama", "Panoramic stereo imaging" and "omnivergent imaging" concern distinct techniques for creating such three-dimensional images. Some techniques utilize one or more image capturing devices, e.g., cameras or other input source, to define stereo images corresponding to an environment about the image capturing devices.

For example, the conference paper *Stereo panorama with a single camera,* Peleg and Ben-Ezra, in Proc. Computer Vision and Pattern Recognition Conf., pp. 395–401 (1999), discusses creating mosaic images from a rotating camera, dealing with incident problems of parallax and scale changes, and using a single camera to create two stereo panoramic views, one for each eye, through multiple viewpoint image projections.

The paper *Stereo reconstruction from multiperspective panoramas,* Heung-Yeung Shum and Richard Szeliski, in IEEE Int'l Conference on Computer Vision, pp. 14–21 vol. 1 (1999), discusses computing depth maps from a collection of images, where camera motion is constrained to planar concentric circles. The resulting collection of regular perspective images is sampled into a set of multiple perspective panoramas, and depth maps can be computed from the sampled images.

The conference paper *Omnivergent Stereo* by Heung-Yeung Shum, and Seitz, in IEEE Int'l Conference on Computer Vision, pp. 22–29 vol. 1 (1999), discusses a virtual sensor for 3D image construction, where instead of using planar perspective images that collect many rays at a fixed viewpoint, omnivergent cameras are instead used to collect a small number of selected rays at many different viewpoints. The collected 2D manifold of rays is arranged into two multiple-perspective images allowing for stereo reconstruction, and, according to the authors, 3D models can be reconstructed with minimal error since every point in the model is defined with respect to two rays having maximum vergence angle. However, this document fails to teach how a physical capture device can be created to implement the techniques discussed in the document.

It will be appreciated by those skilled in the art that these three references are presented for exemplary purposes to illustrate current state of the art, and to show lack of knowledge in the art as to how to effectively build an omnivergent stereo image capture device not suffering from limitations discussed in these references.

BRIEF DESCRIPTION OF THE DRAWINGS

The features and advantages of the present invention will become apparent from the following detailed description of the present invention in which.

DETAILED DESCRIPTION

The following detailed description assumes reader familiarity with the mathematics and principles of stereo and omnivergent imaging.

Figure 1:
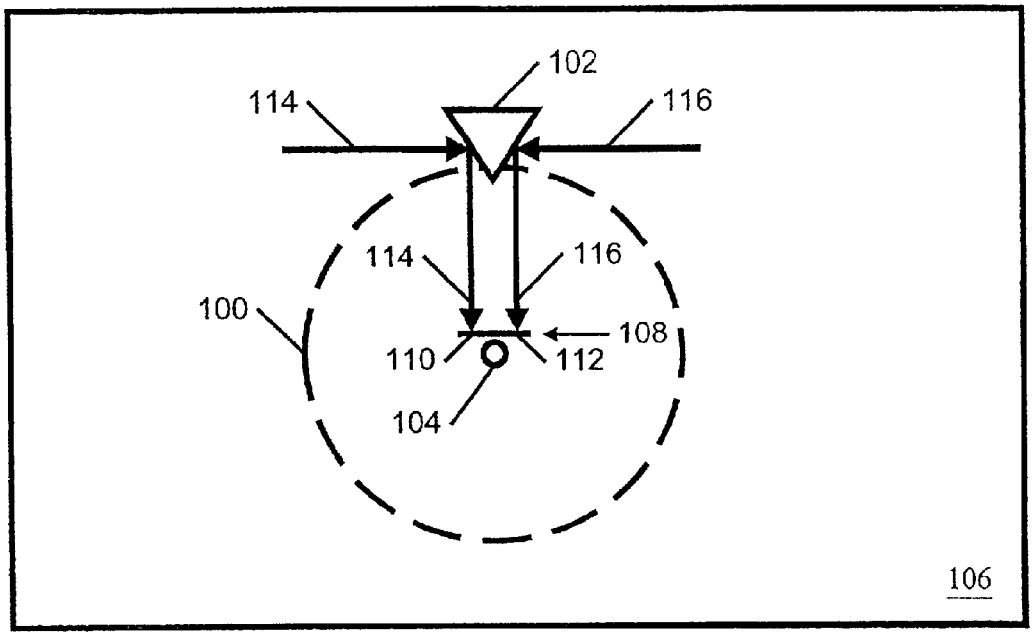
FIG. 1 illustrates a top view according to one embodiment of an image recorder having a cylindrical region defined by the rotation path of a deflector.

FIG. 1 illustrates a top view according to one embodiment of an omnivergent stereo recorder. A cylindrical region 100 is defined by the rotation path of a deflector 102 about an axis of rotation 104 that is perpendicular to a rotation plane 106. In one embodiment, on, adjacent or proximate to the axis of rotation is a receptor 108 comprising an array of image sensors that is also perpendicular to the rotation plane. In illustrated embodiments, the receptor comprises two one-dimensional columns 110, 112 of sensors. However, it will be appreciated that other arrangements may be used.

As illustrated, there are two inputs 114, 116 to the deflector 102 that are tangential to the cylindrical region 100. In one embodiment, the inputs are directly opposing each other so as to form a 180° angle between them. In one embodiment, the deflector is a prism and the inputs are light rays. It will be appreciated, however, other visible and/or non-visible electromagnetic energy may be converged with the deflector 102, and the deflector will have properties appropriate to the electromagnetic energy being reflected. For example, the deflector may be a physical deflector—in the case of a prism deflecting light. For certain other forms of electromagnetic energy, the deflector may be a generated deflection field, such as a magnetic field.

Figure 2:
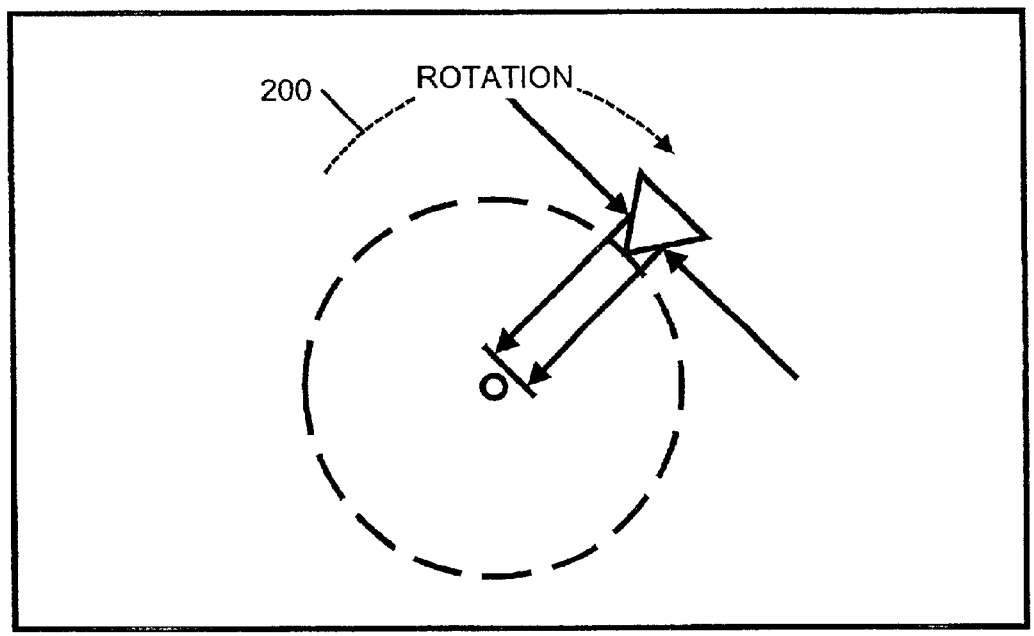
FIG. 2 illustrates a rotation of the FIG. 1 deflector.

When the two inputs 114, 116 reach the deflector 102, they are deflected so as to converge on the sensors 110, 112. Assuming a left-to-right arrangement in the figure, as illustrated, the left input 114 is deflected towards the left sensor 110, and the right input 116 is deflected towards the right sensor 112. For each rotational position of the deflector-sensor assembly, the sensors are used to record the received input for the given rotational position. After recording the input, as illustrated in FIG. 2, the sensors can be rotated 200 to a new rotational position and inputs collected again. This process of rotation, collection of input, and continuing rotation can be repeated continuously.

Figure 3:
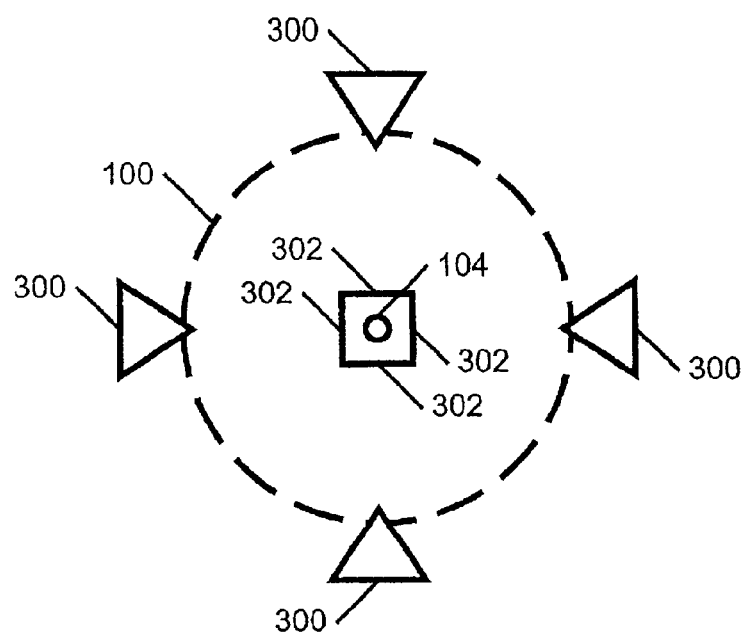
FIG. 3 illustrates an alternate embodiment utilizing four deflectors and four sensors.

The rate of rotation can be accelerated or decreased according to temporal sampling needs. For example, to generate a live broadcast of three-dimensional data the rotation speed needs to be at least 1800 rotations per minute (RPM) to maintain a frame rate of 30 frames per second (FPS). It will be appreciated that a 30 FPS can also be achieved with a lower rotational speed by having multiple deflectors 102 and receptors 108. For example, as illustrated in FIG. 3, four deflectors 300 can be arranged with four sensors 302 to allow four concurrent samples to be taken for a given rotation position. This embodiment reduces rotation speed to 450 RPM for maintaining a frame rate of 30 FPS, since a full revolution of samples is now collected in a quarter turn. Alternatively, this embodiment allows quadrupling the frame rate. It will be appreciated that an arbitrary number of sensors and deflectors may be used.

To create an omnivergent stereo image pair, a first image is defined by compiling all leftward inputs, i.e. the set of inputs 114, captured over a complete revolution of a deflector-sensor assembly (e.g., a combination of a deflector 102 and a sensor 108) A second image is similarly defined using the rightward inputs, i.e. the set of inputs 116 captured over a complete revolution of the deflector-sensor assembly. These two images form an omnivergent stereo image pair which compactly represents the three dimensional structure of the environment surrounding the invention.

Figure 4:
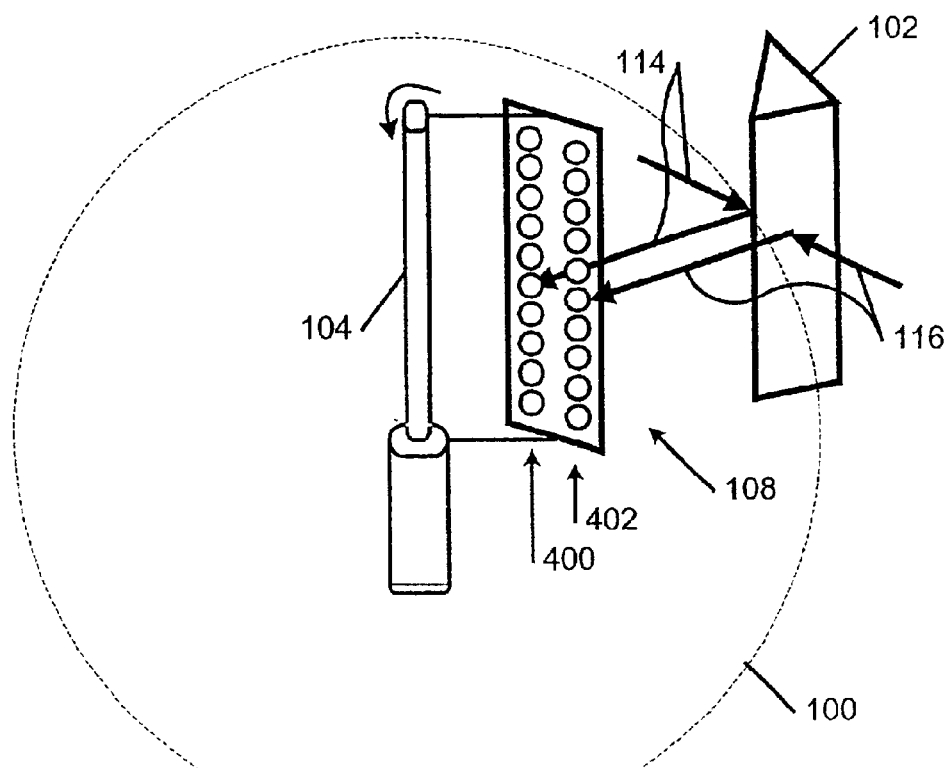
FIG. 4 illustrates a perspective view of the FIG. 1 embodiment.

FIG. 4 illustrates a perspective view of the FIG. 1 embodiment. As in FIG. 1, illustrated are the cylindrical region 100 defined by the rotation path of the deflector 102 about the axis of rotation 104. As can now be seen in FIG. 4, the deflector and sensors are mechanically related. As the deflector is rotated, the array of sensors 400, 402 (corresponding to FIG. 1 items 110, 112) rotates in tandem with the deflector. During rotation, the sensors constantly receive the deflected input 114, 116.

It will be appreciated that sensor arrays 400, 402, can be arbitrarily dense and have diverse physical arrangements depending on the technology used to create the sensor arrays. The more sensors there are, the better the vertical resolution of captured images, and when combined with arbitrary rotation speeds, captured image data can be arbitrarily detailed and dense. It will also be appreciated that the distance between the deflector 102 and the axis of rotation 104 may be arbitrarily adjusted so as to determine a desired depth of field and maximum vergence angle for imaging a particular environment.

Once the omnivergent stereo images have been captured and determined, one can then select an arbitrary viewpoint from within the cylindrical region 100 and use image-based rendering techniques to render a virtual image with respect to the arbitrarily selected viewpoint. Selection and rendering may be performed in real time, allowing for significant advances in telepresence, video conferencing applications, three dimensional gaming applications, and other applications in which it would be useful to allow users to select arbitrary viewpoints in a scene. The invention enables users to experience holographic television without the need for holograms as intermediate storage. The limitation is that the viewpoints can only be selected from within the cylinder 100.

In one embodiment, multiple omnivergent stereo image capturing devices (not illustrated) are used to determine omnivergent stereo images from multiple viewpoints. These multiple omnivergent stereo images are then synthesized into a large viewpoint selection region comprising the individual cylindrical regions of the multiple capturing devices. In one embodiment, the multiple capturing devices are arranged so that their cylindrical regions abut each other. In another embodiment, synthesizing includes computing values for intervening spaces between cylindrical regions.

Figure 5:
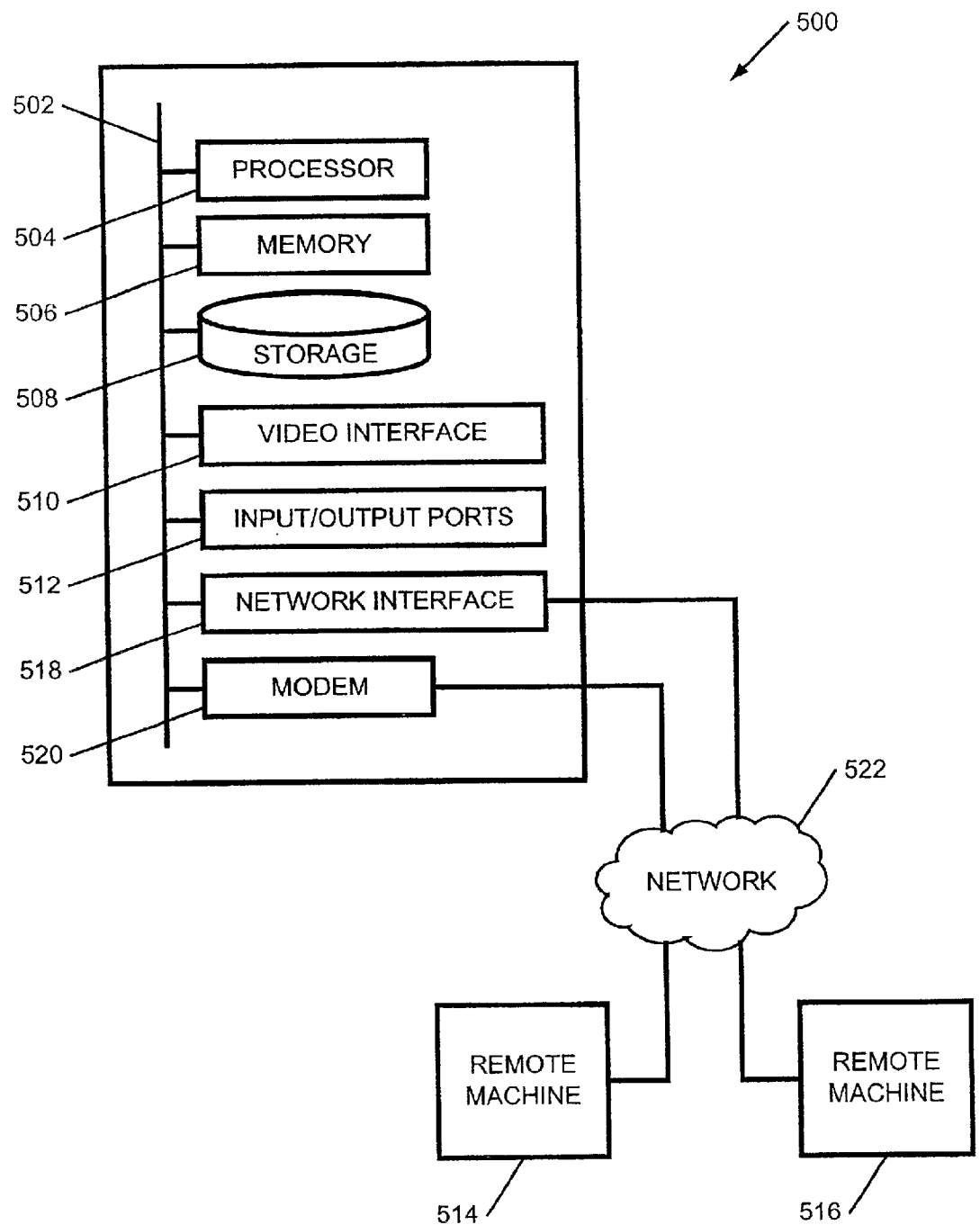
FIG. 5 illustrates a suitable computing environment in which certain aspects of the invention may be implemented.

FIG. 5 and the following discussion are intended to provide a brief, general description of a suitable computing environment in which certain aspects of the illustrated invention may be implemented. It will be appreciated by one skilled in the art that the invention may be used in applications such as simulated holographic television videoconferencing, three-dimensional gaming, virtual reality environment, to capture and/or react to movement within an environment, e.g., user gesticulation, or other application desiring three-dimensional representations of an environment.

Towards these ends, the invention may incorporate or be incorporated within, controlled by, or otherwise communicatively coupled with a machine 500 having system bus 502 for coupling various machine components. Typically, attached to the bus are one or more processors 504, a memory 506 (e.g., RAM, ROM), storage devices 508, a video interface 510, and input/output interface ports 512. The system may include embedded controllers, such as programmable logic devices or gate arrays, Application Specific Integrated Circuits (ASIC), single-chip computers, etc.

The system may operate in a networked environment using physical and/or logical connections to one or more remote systems 514, 516 through a network interface 518, modem 520, or other pathway. Systems may be interconnected by way of a wired or wireless network 522, including an intranet, the Internet, local area networks, wide area networks, cellular, cable, laser, satellite, microwave, "Blue Tooth" type networks, optical, infrared, or other carrier.

The invention may be described by reference to program modules or instructions for performing tasks or implementing abstract data types, e.g., procedures, functions, data structures, application programs, etc., that may be stored in memory 506 and/or storage devices 508 and associated volatile and non-volatile storage media, e.g., magnetic, optical, biological, or other storage, as well as transmission environments such as network 522 over which program modules may be delivered in the form of packets, serial data, parallel data, or other transmission format. Program modules or instructions may be stored in machine accessible media, including wired and wirelessly accessible media.

Thus, for example, assuming a three-dimensional videoconferencing or multi-player game, machine 500 and remote devices 514, 516 operate to determine an omnivergent stereo image of their respective environments. These stereo images can then be shared among users of the machines 500, 514, 516 to allow respective users to selectively define viewpoints within other users' environments. It will be appreciated that remote machines 514, 516 may be configured like machine 500, and therefore include many or all of the elements discussed for machine. It should also be appreciated that machines 500, 514, 516 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, even though the foregoing discussion has focused on particular embodiments, it is understood other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless indicated otherwise, embodiments are combinable into other embodiments.

Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for constructing a first image and a second image of an omnivergent stereo image pair, comprising:

rotating a deflector about a rotation axis, the deflector positioned a distance from the rotation axis and having plural deflection regions;

positioning a receptor proximate to the rotation axis, the receptor comprising a first portion of sensors and a second portion of sensors;

deflecting a first input received at a first deflection region of the deflector to the first portion of sensors;

deflecting a second input received at a second deflection region of the deflector to a second portion of sensors;

determining the first image based at least in part on the first input;

determining the second image based at least in part on the second input; and determining a first omnivergent stereo pair based at least in part on the first image and the second image.

2. The method of claim 1, further comprising: wherein both the first image and the second image are omnivergent images.

3. The method of claim 1, further comprising:

selecting a view point; and rendering a three dimensional imaged based at least in part on the view point and the first omnivergent stereo pair.

4. The method of claim 1, wherein the distance is fixed.

5. The method of claim 1, further comprising:

performing the method at a first location to determine the first omnivergent stereo pair;

performing the method at a second location to determine a second omnivergent stereo pair; and synthesizing an environment model based at least in part on the first omnivergent stereo pair and the second omnivergent stereo pair.

6. The method of claim 5, wherein the first location is proximate to the second location.

7. The method of claim 5, wherein a first region defined by rotating the deflector about the axis at the first location abuts a second region defined by rotating the deflector about the axis at the second location.

8. The method of claim 1, further comprising:

receiving a configuration input; and setting the distance with respect to the configuration input.

9. The method of claim 8, wherein the configuration input corresponds to a desired size for a region in which a viewpoint may be selected.

10. The method of claim 9, further comprising:

receiving a viewpoint selection; and rendering a three dimensional image based on the viewpoint selection and the first and the second image.

11. A method for constructing an omnivergent stereo image pair, comprising:

defining a cylindrical region having an axis of rotation perpendicular to a rotation plane, the cylindrical region defined with respect to an array of sensors disposed parallel to the axis of rotation, and a prism disposed parallel to the vertical array; and determining an environment about the cylindrical region by rotating the cylindrical region through rotational positions, and while rotating:

receiving a first input at a first face of the prism for a rotational position of the cylindrical region, the first input having a first travel path tangential to the cylindrical region and corresponding to a first portion of the environment, and receiving a second input at a second face of the prism for the rotational position of the cylindrical region, the second input having a second travel path tangential to the cylindrical region and corresponding to a second portion of the environment.

12. The method of claim 11, further comprising:

storing the first input and the second input for each of plural rotational positions of the cylindrical region;

selecting a view point within the cylindrical region; and constructing a convergent stereo image of the environment with respect to the selected view point and the stored first and second inputs for the plural rotational positions of the cylindrical region.

13. The method of claim 11, wherein the first travel path is opposite of the second travel path.

14. The method of claim 11, wherein the first and second travel paths are parallel to the rotation plane.

15. An article of manufacture, comprising:

a machine accessible medium having associated data, which when accessed by the machine, results in the machine performing:

rotating a deflector rotably mounted a distance from a rotation axis, the deflector having plural deflection regions for deflecting inputs to a receptor positioned proximate to the rotation axis, the receptor comprising a first portion of sensors and a second portion of sensors;

determining the first image based at least in part on a first input received at a first deflection region of the deflector that is deflected towards the receptor;

determining the second image based at least in part on a second input received at a second deflection region of the deflector that is deflected towards the receptor;

determining a first omnivergent stereo pair based at least in part on the first image and the second image.

16. The apparatus of claim 15, wherein both the first image and the second image are omnivergent images.

17. The apparatus of claim 15, the data comprising further data capable of directing a machine to perform:

selecting a view point; and rendering a three dimensional imaged based at least in part on the view point and the first omnivergent stereo pair.

18. The apparatus of claim 15, wherein the distance is fixed.

19. The apparatus of claim 15, the data comprising further data capable of directing a machine to perform performing the method at a first location to determine the first omnivergent stereo pair;

performing the method at a second location to determine a second omnivergent stereo pair; and synthesizing an environment model based at least in part on the first omnivergent stereo pair and the second omnivergent stereo pair.

20. The apparatus of claim 19, wherein the first location is proximate to the second location.

21. The apparatus of claim 19, wherein a first region defined by rotating the deflector about the axis at the first location abuts a second region defined by rotating the deflector about the axis at the second location.

22. The apparatus of claim 15, the data comprising further data capable of directing a machine to perform:

receiving a configuration input; and setting the distance with respect to the configuration input.

23. The apparatus of claim 22, wherein the configuration input corresponds to a desired size for a region in which a viewpoint may be selected.

24. The apparatus of claim 23, the data comprising further data capable of directing a machine to perform:

receiving a viewpoint selection; and rendering a three dimensional image based on the viewpoint selection and the first and the second image.

25. An apparatus comprising a machine accessible medium having instructions associated therewith for constructing a first image and a second image of a convergent stereo image pair, the instructions capable of directing a machine to perform:

defining a cylindrical region having an axis of rotation perpendicular to a rotation plane, the cylindrical region defined with respect to an array of sensors disposed parallel to the axis of rotation and a prism disposed parallel to the vertical array;

determining an environment about the cylindrical region by rotating the cylindrical region through rotational positions, and while rotating:

receiving a first input at a first face of the prism for a rotational position of the cylindrical region, the first input having a first travel path tangential to the cylindrical region and corresponding to a first portion of the environment, and receiving a second input at a second face of the prism for the rotational position of the cylindrical region, the second input having a second travel path tangential to the cylindrical region and corresponding to a second portion of the environment.

26. The apparatus of claim 25, the instructions comprising further instructions capable of directing a machine to perform:

storing the first input and the second input for each of plural rotational positions of the cylindrical region;

selecting a view point within the cylindrical region; and constructing a convergent stereo image of the environment with respect to the selected view point and the stored first and second inputs for the plural rotational positions of the cylindrical region.

27. The method of claim 25, wherein the first travel path is opposite of the second travel path.

28. The method of claim 25, wherein the first and second travel paths are parallel to the rotation plane.

29. An apparatus for acquiring input for a first image and a second image of a convergent stereo image pair, comprising:

a deflector rotably mounted a distance from a rotation axis, the deflector having plural deflection regions;

a receptor positioned proximate to the rotation axis, the receptor comprising a first portion of sensors and a second portion of sensors;

a first memory for storing a first input received at a first deflection region of the deflector and deflected towards the first portion of sensors; and a second memory for storing a second input received at a second deflection region and deflected towards the second portion of sensors.

30. The apparatus of claim 29, further comprising:

an image constructor which determines the first image based at least in part on the first input, and the second image based at least in part on the second input.

31. The apparatus of claim 30, further comprising:

an interface for receiving a selected view point; and a renderer for rendering a three dimensional imaged based at least in part on the selected view point, the first image, and the second image.

32. The apparatus of claim 29, wherein the deflector rotates about the rotation axis, and while rotating, subsequent first and second inputs are received, deflected, and stored in the first memory and the second memory.

33. The apparatus of claim 29, further comprising:

an interface for receiving a configuration input; and setting the distance with respect to the configuration input.

34. The apparatus of claim 33, wherein the configuration input corresponds to a selected one of a desired depth of field for the convergent stereo image, and a desired size for a region in which a viewpoint may be selected.

* * * * *